US012300879B2

United States Patent
Park et al.

(10) Patent No.: US 12,300,879 B2
(45) Date of Patent: May 13, 2025

(54) WIRELESS COMMUNICATION DEVICE

(71) Applicant: KMW INC., Hwaseong-si (KR)

(72) Inventors: Min Sik Park, Hwaseong-si (KR); Jun Woo Yang, Hwaseong-si (KR); Bung Chul Kim, Osan-si (KR); In Ho Kim, Yongin-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 18/387,486

(22) Filed: Nov. 7, 2023

(65) Prior Publication Data

US 2024/0072428 A1    Feb. 29, 2024

Related U.S. Application Data

(63) Continuation of application No. 17/389,342, filed on Jul. 30, 2021, now Pat. No. 11,855,344, which is a
(Continued)

(30) Foreign Application Priority Data

Feb. 1, 2019   (KR) .......................... 10-2019-0013394

(51) Int. Cl.
  *H01Q 1/40*    (2006.01)
  *H01Q 1/24*    (2006.01)
  *H01Q 1/38*    (2006.01)

(52) U.S. Cl.
  CPC ............. *H01Q 1/405* (2013.01); *H01Q 1/246* (2013.01); *H01Q 1/38* (2013.01)

(58) Field of Classification Search
  CPC .......... H01Q 1/246; H01Q 1/40; H01Q 1/405; H01Q 1/42
  See application file for complete search history.

(56) References Cited

U.S. PATENT DOCUMENTS 5,648,891 A    7/1997  Gierut
6,122,161 A    9/2000  Gierut
(Continued)

FOREIGN PATENT DOCUMENTS

CN    202059725 U    11/2011
CN    106410456 A    2/2017
(Continued)

OTHER PUBLICATIONS

Japanese Office Action mailed on May 28, 2024 from the Japanese Patent Office for Japanese Application No. 2023-091793 and its English translation.
(Continued)

*Primary Examiner* — Hoang V Nguyen
(74) *Attorney, Agent, or Firm* — Insight Law Group, PLLC; Seung Lee

(57) ABSTRACT

The present disclosure in at least one embodiment provides a wireless communication device, comprising a lower case, an upper radome, coupled to the lower case, creating a storage space between the lower case and the upper radome, an antenna disposed in the storage space, and a plurality of internal substrates, disposed between the antenna and the lower case in the storage space, of which one of the plurality of internal substrates is connected to the antenna, wherein each internal substrate of the plurality of internal substrates is disposed along a first direction parallel to a surface of the lower case facing the plurality of internal substrates.

16 Claims, 12 Drawing Sheets

Related U.S. Application Data continuation of application No. PCT/KR2020/000388, filed on Jan. 9, 2020.

(56) References Cited

U.S. PATENT DOCUMENTS

| | | | |
|---|---|---|---|
| 7,043,280 | B1 | 5/2006 | Shields et al. |
| 2005/0033513 | A1 | 2/2005 | Gasbarro |
| 2011/0032158 | A1 | 2/2011 | Rodger et al. |
| 2014/0347231 | A1 | 11/2014 | Kerselaers et al. |
| 2017/0170549 | A1 | 6/2017 | Buondelmonte |

FOREIGN PATENT DOCUMENTS

| | | | |
|---|---|---|---|
| CN | 106464371 A | 2/2017 | |
| CN | 102592744 A | 7/2017 | |
| JP | 2001-324561 A | 11/2001 | |
| JP | 2006-101467 A | 4/2006 | |
| JP | 2014-86946 A | 5/2014 | |
| JP | 2014-232981 A | 12/2014 | |
| JP | 2016-92713 A | 5/2016 | |
| JP | 2017-34302 A | 2/2017 | |
| KR | 10-2014-0126132 A | 10/2014 | |
| WO | 2015-175364 A1 | 11/2015 | |
| WO | 2018/093176 A2 | 5/2018 | |
| WO | WO-2018110083 A1 * | 6/2018 | ............. H01Q 1/241 |

OTHER PUBLICATIONS

International Search Report for PCT/KR2020/000388 mailed Apr. 16, 2020 and its English translation.

Chinese office action mailed Mar. 14, 2022 for Japanese Application No. 202080012241.1.

Japanese office action mailed Aug. 2, 2022 for Japanese Application No. 2021-544375 and its English translation.

Extended European Search Report mailed Jan. 4, 2023 for European Application No. 20748506.1.

Non-final Office Action mailed on Aug. 23, 2023 for U.S. Appl. No. 17/389,342.

Notice of Allowance mailed on May 8, 2023 for U.S. Appl. No. 17/389,342.

* cited by examiner (a)

(b)

(c)

WIRELESS COMMUNICATION DEVICE

CROSS-REFERENCE TO RELATED APPLICATIONS

The present application is a continuation of U.S. application Ser. No. 17/389,342, filed on Jul. 30, 2021, which is a continuation of International Application No. PCT/KR2020/000388, filed on Jan. 9, 2020, which claims priority from, Korean Patent Application Number 10-2019-0013394, filed Feb. 1, 2019, the disclosure of which are incorporated by reference herein in their entirety.

TECHNICAL FIELD

The present disclosure relates to a wireless communication device.

BACKGROUND

The statements in this section merely provide background information related to the present disclosure and do not necessarily constitute prior art.

A wireless communication device used for transmission and reception of wireless signal is generally installed in an outdoor environment, such as rooftop of a building.

On the other hand, in order for the wireless communication device to exhibit the original function, it is difficult to change the arrangement of the internal components of the wireless communication device. As a result, the wireless communication device does not harmonize with building's exterior, spoiling the aesthetic aspects of building exterior.

Studies have been made in many ways to improve the size and design of wireless communication devices so that the wireless communication device does not impair the aesthetics of building exteriors, but improvements in the size and design are limited in terms of maintaining the functionality of the wireless communication device.

SUMMARY

The present disclosure in at least one embodiment provides a wireless communication device, comprising a lower case, an upper radome, coupled to the lower case, creating a storage space between the lower case and the upper radome, an antenna disposed in the storage space, and a plurality of internal substrates, disposed between the antenna and the lower case in the storage space, of which one of the plurality of internal substrates is connected to the antenna, wherein each internal substrate of the plurality of internal substrates is disposed along a first direction parallel to a surface of the lower case facing the internal substrates.

The present disclosure in at least one embodiment provides the wireless communication device, comprising a lower case, an upper case that engages with the lower case, and a plurality of internal substrates disposed between the lower case and the upper case, wherein each of the plurality of internal substrates is disposed along a first direction parallel to a surface of the lower case facing internal substrates.

REFERENCE NUMERALS

Figure 1:
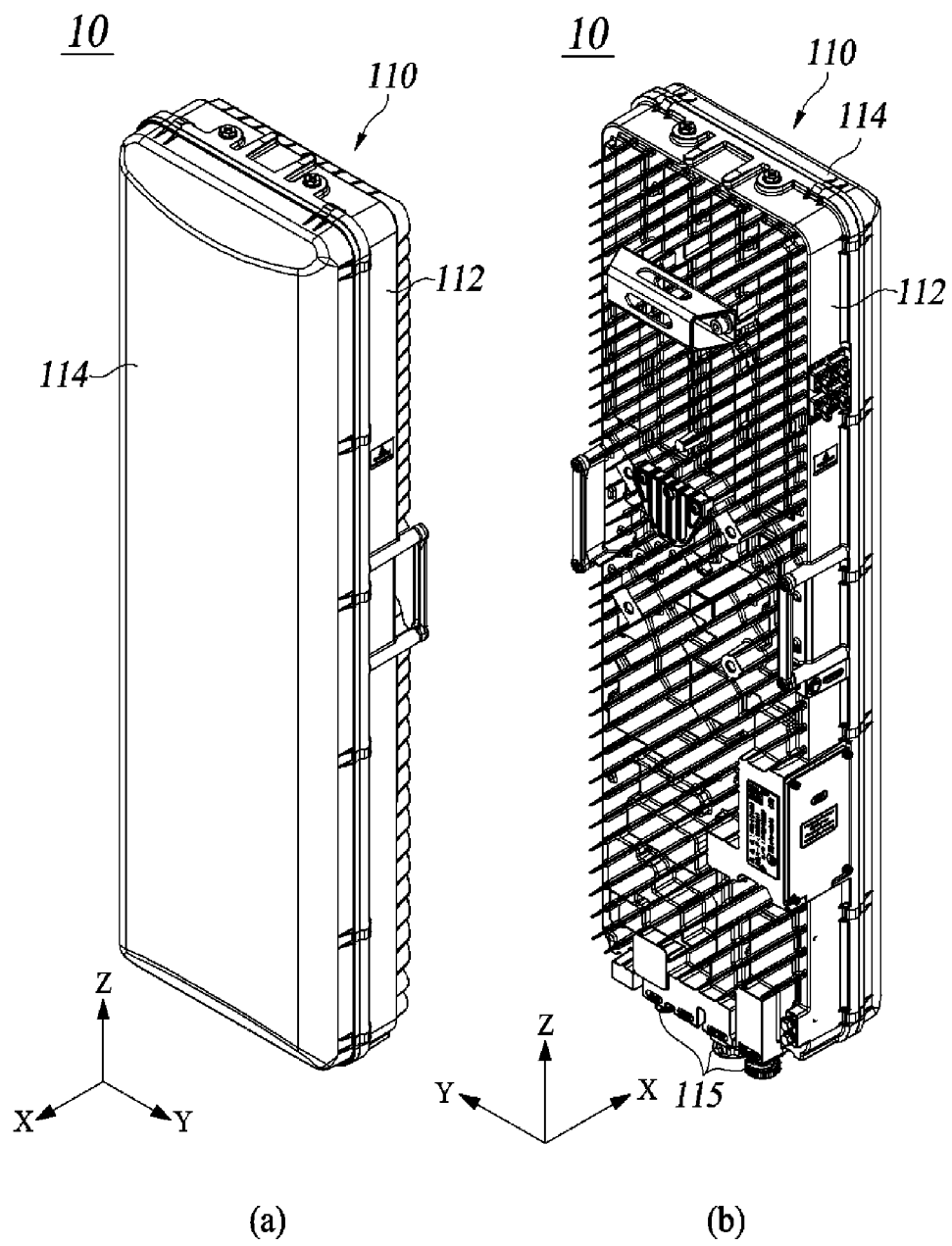
FIG. 1 is a wireless communication device according to an embodiment of the present disclosure.

10: Wireless communication device
110: Housing
112: Lower case
114: Upper radome
120: Antenna
140: Power amplifier
150: Digital board
160: Power supply unit
810: Connection area shield
1010: Hybrid cable
1020: Hybrid box

DETAILED DESCRIPTION

Accordingly, the present disclosure intends to provide a wireless communication device that is configured to arrange a plurality of internal substrates, arranged inside a housing, along a predetermined direction, thereby miniaturizing the wireless communication device and, as a result, achieving aesthetic harmonization with building exterior and city view.

Some exemplary embodiments of the present disclosure are described below with reference to the accompanying drawings. In the following description, like reference numerals preferably designate like elements, although the elements are shown in different drawings. Further, in the following description of some embodiments, a detailed description of known functions and configurations incorporated herein will be omitted for the purpose of clarity and for brevity.

Additionally, alphanumeric codes such as first, second, i), ii), a), b), etc., in numbering components are used solely for the purpose of differentiating one component from the other but not to imply or suggest the substances, the order, or sequence of the components. Throughout this specification, when parts "include" or "comprise" a component, they are meant to further include other components, not excluding thereof unless there is a particular description contrary thereto.

Herein, the horizontal length refers to a length in a direction parallel to the Y-axis with reference to FIG. 1, and the vertical length refers the length in a direction parallel to the Z-axis with reference to FIG. 1. The thickness refers to the length in a direction parallel to the X axis with reference to FIG. 1.

FIG. 1 illustrates a wireless communication device 10 according to an embodiment of the present disclosure.

Specifically, FIG. 1 at (a) shows a perspective view of the wireless communication device 10, and FIG. 1 at (b) shows a rear perspective view thereof.

Referring to FIG. 1 at (a) and FIG. 1 at (b), the wireless communication device 10 may include a housing 110.

The housing 110 may include a lower case 112 and an upper radome 114.

The lower case 112 and the upper radome 114 may be coupled to each other and, in the coupled state, may define a storage space between the lower housing 112 and upper radome 114.

The housing 110 may contain the antenna 120 and the plurality of internal substrates 12 in the storage space. As a result, the housing 110 may protect the antenna 120 and the plurality of internal substrates 12 from external shocks.

The housing 110 may have a shape in which one of the horizontal length and the vertical length is relatively longer than the other.

For example, the value obtained by dividing the longer of the horizontal length and the vertical length of the housing 110 by the smaller length may be 3.0 or larger.

The wireless communication device 10 according to an embodiment of the present disclosure can secure a storage space having a relatively large cross-sectional area by configuring one of the horizontal length and the vertical length of the housing 110 to be relatively long with respect to the other.

As a result, the plurality of internal substrates 12 may be arranged along a predetermined direction in the storage space of the housing 110. Meanwhile thickness of the housing 110 may be relatively thin.

For example, with the lower case 112 and the upper radome 114 coupled, the thickness of the housing 110 may be 165 mm or shorter.

Thus, the wireless communication device 10 according to an embodiment of the present disclosure may be a slim case shape as a whole, thereby having an aesthetic advantage.

The horizontal length, vertical length, and thickness of housing 110 may be 285 mm, 950 mm, and 150 mm, respectively. However, the present disclosure is not limited thereto.

Meanwhile, the wireless communication device 10 may additionally include a plurality of external connection ports 115 and a GPS antenna (not shown).

A plurality of external connection ports 115 may be formed on one side of the housing 110. The wireless communication device 10 may be connected to an external device (not shown) or other wireless communication device 10 via a plurality of external connection ports 115.

The plurality of external connection ports 115 may include, but are not limited to, an alarm port, an optical port, a power supply port, and an RTS port.

The wireless communication device 10 may transmit and receive GPS signals via a GPS antenna (not shown). The GPS antenna may be exposed outside the housing 110 for smooth transmission and reception of GPS signals.

Figure 2:
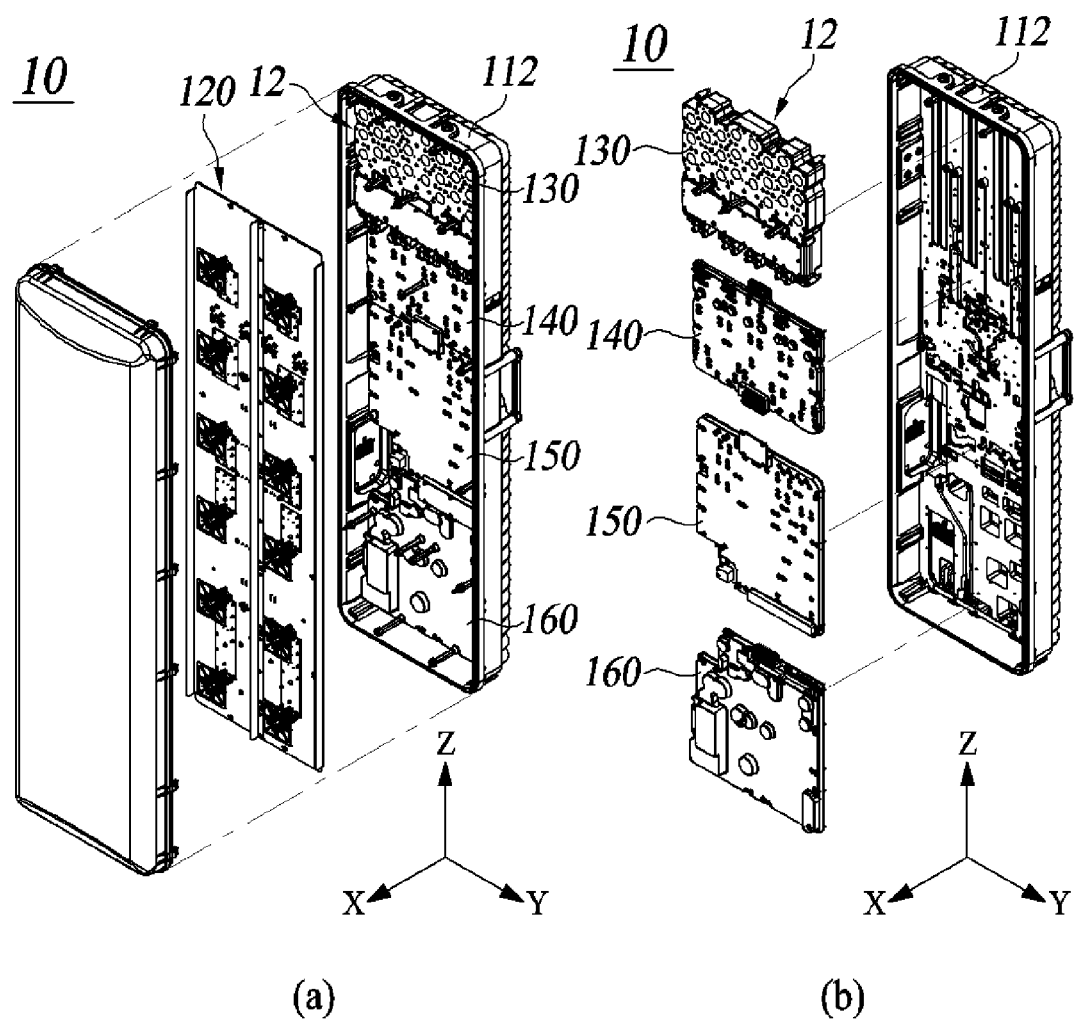
FIG. 2 is an exploded perspective view of a wireless communication device according to an embodiment of the present disclosure.

FIG. 2 is an exploded perspective view of a wireless communication device 10 according to an embodiment of the present disclosure.

Specifically, FIG. 2 at (a) illustrates an exploded perspective view of a state in which a plurality of internal substrates 12 are disposed on the lower case 112, and FIG. 2 at (b) illustrates an exploded view in which the plurality of outer substrates 12 is separated from the lower case 112.

Figure 3:
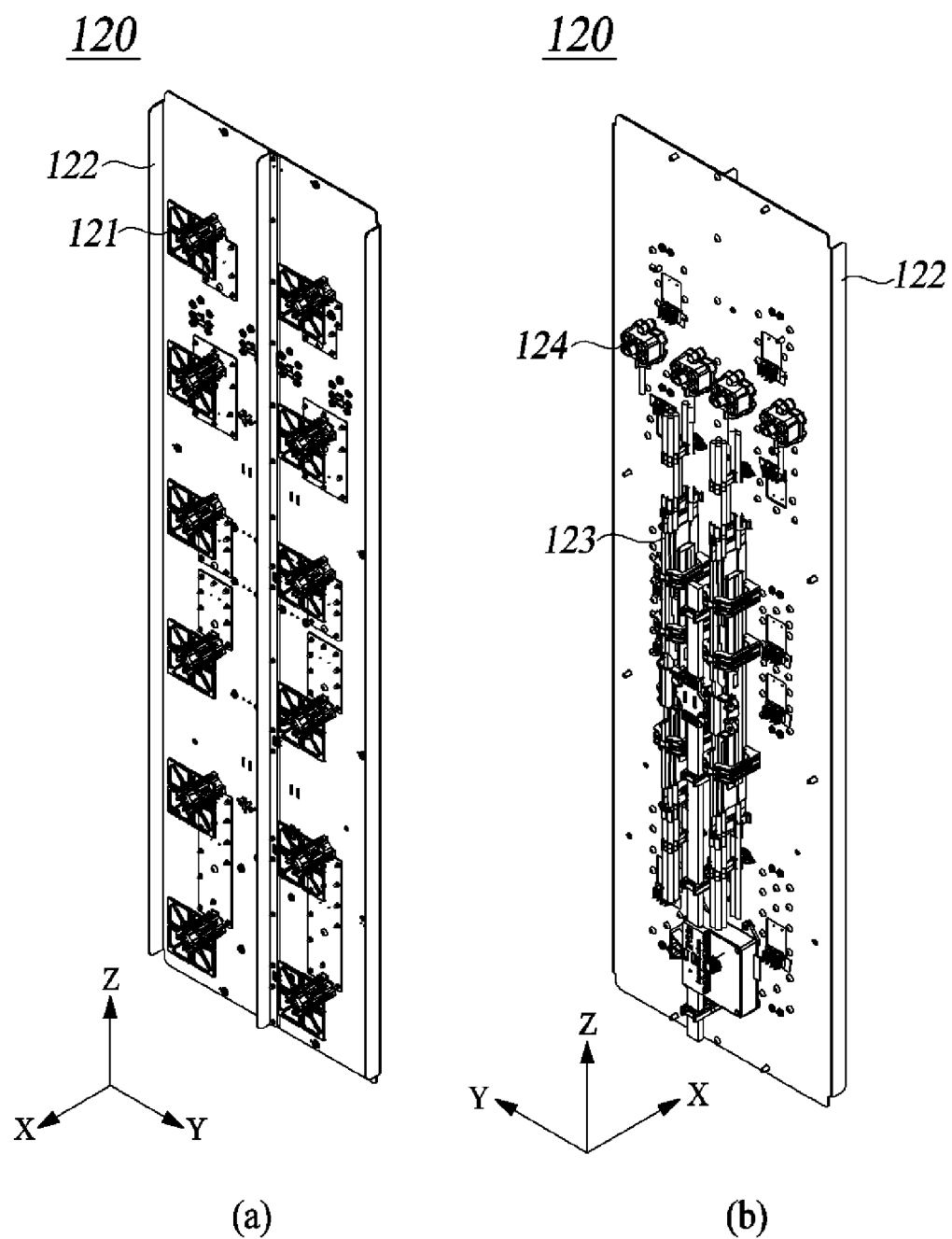
FIG. 3 is an antenna according to an embodiment of the present disclosure.

Referring to FIG. 2 at (a) and FIG. 3 at (b), the wireless communication device 10 may include an antenna 120 and a plurality of internal substrates 12.

The antenna 120 and the plurality of internal substrates 12 may be disposed within a storage space of the housing 110.

In the wireless communication device 10 according to an embodiment of the present disclosure, since the antenna 120 is disposed inside the housing 110, a separate cable is not required for connecting the antenna 120 to the wireless communication device 10. Accordingly, it is possible to minimize transmission loss that may occur by connecting the antenna 120 and the wireless communication device 10 via a cable.

The antenna 120 may be a panel antenna having a plurality of antenna elements 121, and may have a plate shape corresponding to the lower case 112.

The plurality of internal substrates 12 may be disposed between the antenna 120 and the lower case 112 in the storage space. At least one of the plurality of internal substrates 12 may be coupled with an antenna 120, through which signals may be received from or transmitted to the antenna 120.

Each internal substrate 12 of the plurality of internal substrates 12 may be disposed along a first direction parallel to a surface of the lower case 112 facing the internal substrates 12. Herein, the first direction refers to a direction in which the plurality of internal substrates 12 is arranged. For example, the first direction may be parallel to the vertical direction of the housing 110, with reference to FIG. 2.

The wireless communication device 10 according to an embodiment of the present disclosure is characterized in that the housing 110 has a thinner thickness by adopting a method in which a plurality of internal substrates 12 is arranged in a line along a predetermined direction, rather than a method of stacking a plurality thereof.

As such, the wireless communication device 10 according to an embodiment of the present disclosure may be installed in coordination with a surrounding view. As such, the wireless communication device 10 according to an embodiment of the present disclosure has aesthetic benefits.

In FIG. 2, the first direction is shown to be parallel to the vertical direction of the housing 110, but the present disclosure is not limited thereto.

For example, the first direction may be parallel to the horizontal direction of the housing 110. In this case, the plurality of internal substrates 12 may be arranged along the horizontal direction of the housing 110.

Each internal substrate 12 may be arranged in a row along the first direction, but the present disclosure is not limited thereto. For example, each of the internal substrates 12 may be disposed offset from each other along the first direction or in a zigzag shape.

Each internal substrate 12 may be electrically connected to a neighboring internal substrate 12. In this case, a region of each internal substrate 12 other than connecting region with the neighboring internal substrate 12 may not overlap with the neighboring internal substrates 12.

Accordingly, the wireless communication device 10 according to an embodiment of the present disclosure can minimize the overlapping area between each of the plurality of internal substrates 12 and maximize the area of the internal substrate 12 exposed outside. Thereby, heat generated from the plurality of internal substrates 12 may be effectively released.

The plurality of internal substrates 12 may include a front end unit 130, a power amplifying unit 140, a digital board 150, and a power supply unit 160. However, the present disclosure is not limited thereto, and the plurality of internal substrates 12 may also include other members.

The plurality of internal substrates 12 may be disposed in the order of the front end unit 130, the power amplifying unit 140, the digital board 150, and the power supply unit 160 along the first direction.

Such an arrangement of the internal substrate 12 may be an arrangement according to a processing order of signals transmitted to or received from the antenna 120. This sequence of placement can thus minimize electrical connections between each internal substrate 12 and other internal substrates 12 that are not adjacent thereto.

Accordingly, it is possible to minimize the configuration of the circuit for connecting each internal substrate 12 to another internal substrate 12, which is not adjacent thereto, and thus the configuration of the plurality of internal substrates 12 can be further simplified.

FIG. 3 illustrates an antenna 120 according to an embodiment of the present disclosure.

Specifically, FIG. 3 at (a) illustrates a perspective view of the antenna 120, and FIG. 3 at (b) illustrates a rear perspective view thereof.

Referring to FIG. 3, the antenna 120 may include an antenna element 121, an antenna substrate 122, and a phase converter 123.

The plurality of antenna elements 121 may be disposed on the antenna substrate 122.

Specifically, the antenna element 121 may be disposed on a surface of the antenna substrate 122 facing the upper radome 114.

A phase converter 123 may be disposed on the other side of the antenna substrate 122 facing the lower case 112.

The antenna element 121 may transmit and receive electromagnetic waves, and the phase converter 123 may convert the phase of the transmitted and received electromagnetic waves.

The antenna 120 may further include a first connection port 124 for connecting with the front end unit 130.

The first connection port 124 may be disposed on the other surface of the antenna substrate 122 and may be connected to a second connection port 131 of the front end unit 130. The first connection port 124 may illustratively be configured as a PICd connector.

The antenna 120 may be sized suitable for being stored in a storage space of the housing 110. For example, the horizontal length, vertical length, and thickness of the antenna 120 may be 252 mm, 914 mm, and 81 mm, respectively. However, the present disclosure is not limited thereto.

Figure 4:
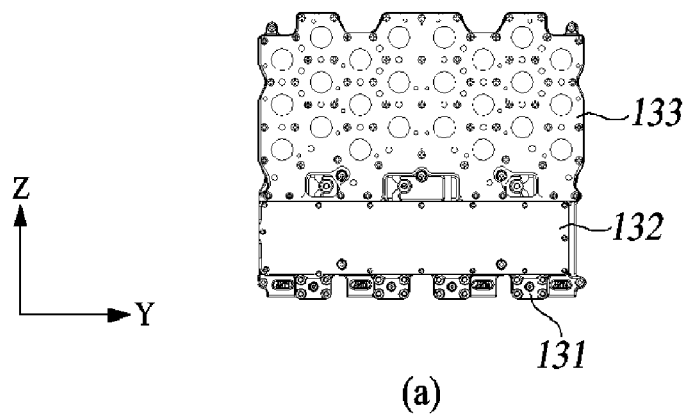
FIG. 4 is a front end according to an embodiment of the present disclosure.
Figure 4:
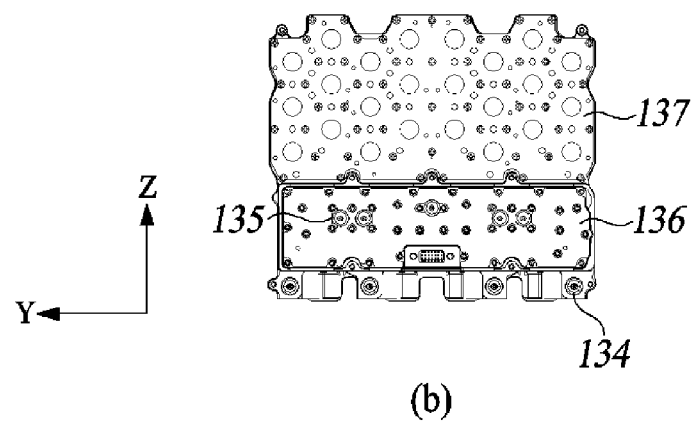
Figure 4:
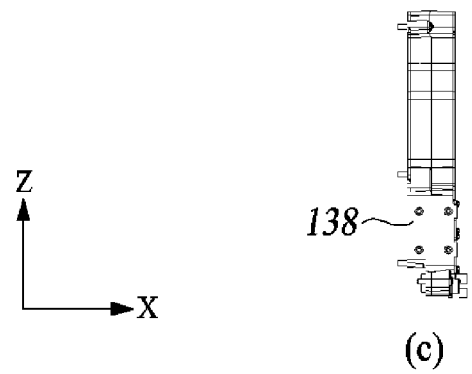

FIG. 4 illustrates a front end unit 130 according to an embodiment of the present disclosure.

Specifically, FIG. 4 at (a) illustrates a front view of the front end unit 130, FIG. 4 at (b) illustrates the rear view of the front end unit 130 and FIG. 4 at (c) illustrates a side view of the front end 130.

Referring to FIG. 4 at (a), the front end unit 130 may include the second connection port 131, a CPL printed circuit board 132, and a transmission path (Tx Path) 133.

The second connection port 131, the CPL printed circuit board 132, and the transmission path 133 may be disposed on one side of the front end unit 130 facing the antenna 120, but the present disclosure is not limited thereto.

The second connection port 131 may be connected to the first connection port 124 of the antenna 120, and may be configured as an exemplary PICd connector.

Referring to FIG. 4 at (b), the front end unit 130 may include a third connection port 134, a fourth connection port 135, an LNA printed circuit board 136, and a reception path (Rx Path) 137.

The third connection port 134, the fourth connection port 135, the LNA printed circuit board 136, and the reception path 137 may be disposed on the other side of the front end unit 130 facing the lower case 112, but the present disclosure is not limited thereto.

The third connection port 134 may be connected to a fifth connection port 143 (in FIG. 5) of the power amplifier 140. The third connection port 134 may illustratively be configured as a TBMA connector.

The fourth connection port 135 may be connected to a seventh connection port 154 (in FIG. 6) of the digital board 150. The fourth connection port 135 may illustratively be configured as a pin socket connector.

Referring to FIG. 4 at (c), the front end unit 130 may further include a transaction monitor 138 formed on one side of the front end unit 130.

Referring to FIG. 4 at (a) to FIG. 4 at (c), the front end unit 130 may be sized to be stored in a storage space of the housing 110. For example, the horizontal length, vertical length, and thickness of the front end unit 130 may be 252 mm, 223 mm, and 40 mm respectively. However, the present disclosure is not limited thereto.

Figure 5:
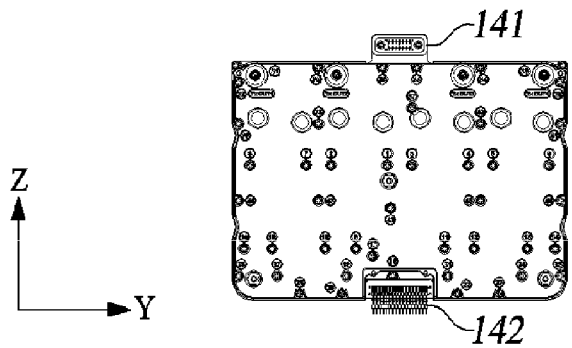
FIG. 5 is a power amplifying unit according to an embodiment of the present disclosure.
Figure 5:
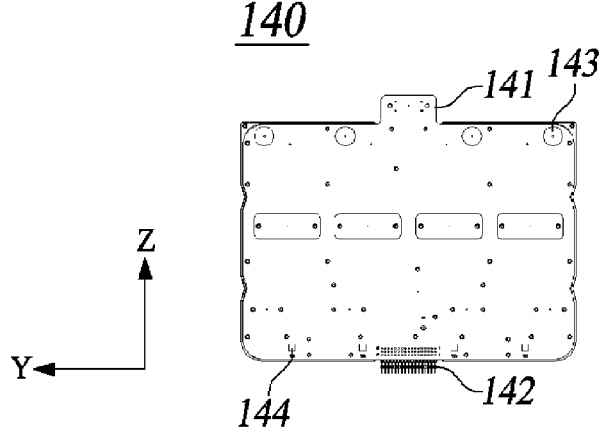
Figure 5:
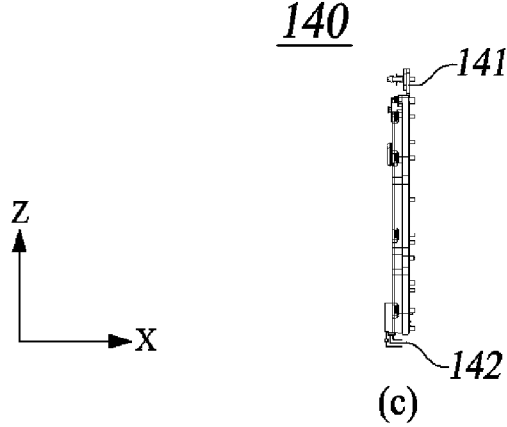

FIG. 5 illustrates a power amplifier 140 according to an embodiment of the present disclosure.

Specifically, FIG. 5 at (a) illustrates a front view of the power amplifying unit 140, FIG. 5 at (b) illustrates the rear view of the power amplifying unit 140, and FIG. 5 at (c) illustrates a side view of the power amplifying unit 140.

Referring to FIG. 5 at (a), the power amplifying unit 140 may include a first interface 141 and a second interface 142.

The first interface 141 may be coupled to the LNA printed circuit board 136 of the front end unit 130 and the second interface 142 may be coupled to a third interface 151 (in FIG. 5) of the digital board 150.

Referring to FIG. 5 at (b), the power amplifier 140 may include a fifth connection port 143 and a sixth connection port 144.

The fifth connection port 143 may be connected to the third connection port 134 of the front end unit 130, and the sixth connection port 144 may be coupled to a seventh connection port 154 (in FIG. 6) of the digital board 150.

Referring to FIG. 5 at (a) to FIG. 5 at (c), the power amplifier 140 may have a size suitable for being accommodated in the storage space of the housing 110. For example, the horizontal length and the vertical length of the power amplifier 140 may be 252 mm and 180 mm, respectively. However, the present disclosure is not limited thereto.

Figure 6:
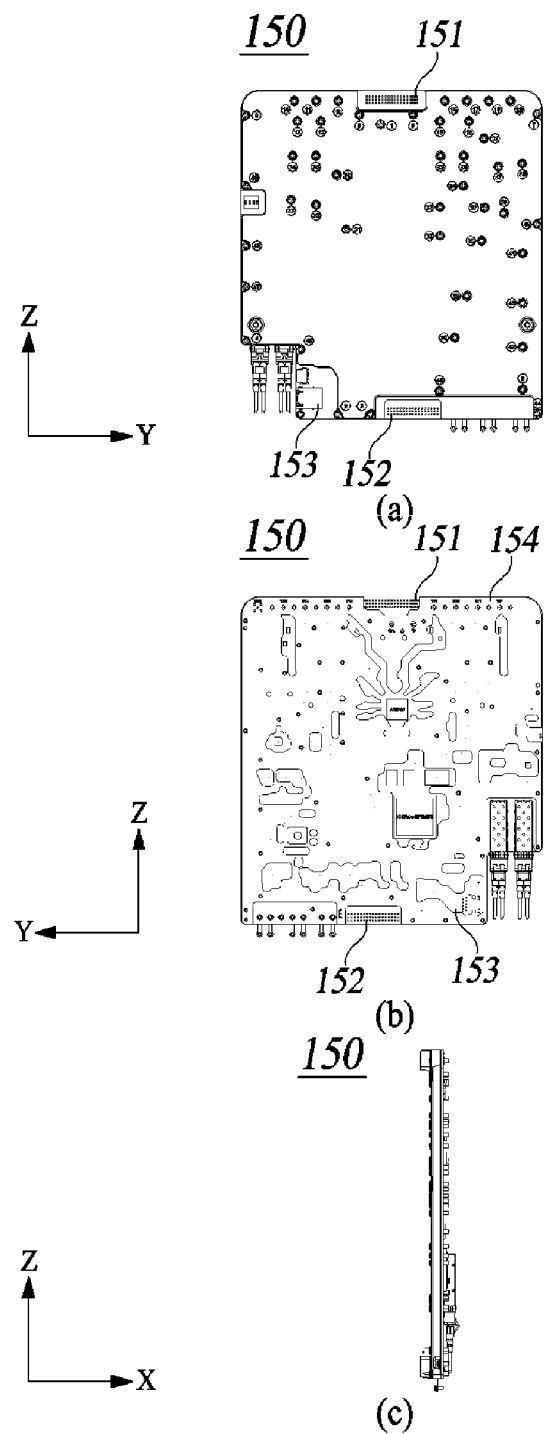
FIG. 6 is a digital board according to an embodiment of the present disclosure.

FIG. 6 illustrates the digital board 150 according to an embodiment of the present disclosure.

Specifically, FIG. 6 at (a) illustrates a front view of the digital board 150, FIG. 6 at (b) illustrates the rear view of a digital board 150 and FIG. 6 at (c) illustrates side views of the digital board 150.

Referring to FIG. 6 at (a), the digital board 150 may include a third interface 151, a fourth interface 152, and a debug member 153.

The third interface 151 may be coupled to the second interface 142 of the power amplifier 140, and the fourth interface 152 may be connected to the fifth interface 162 (in FIG. 7) of the supply 160.

Referring to FIG. 6 at (b), the digital board 150 may include a seventh connection port 154.

The seventh connection port 154 may be connected to the sixth connection port 144 of the power amplifier 140 or to the LNA printed circuit board 136 of the front end unit 130. The seventh connection port 154 may illustratively be configured as a pin socket connector.

Referring to FIG. 6 at (a) to FIG. 6 at (c), the digital board 150 may be sized suitable for being stored in a storage space of the housing 110. For example, the horizontal and vertical lengths of the digital board 150 may be 247 mm and 270 mm, respectively. However, the present disclosure is not limited thereto.

Figure 7:
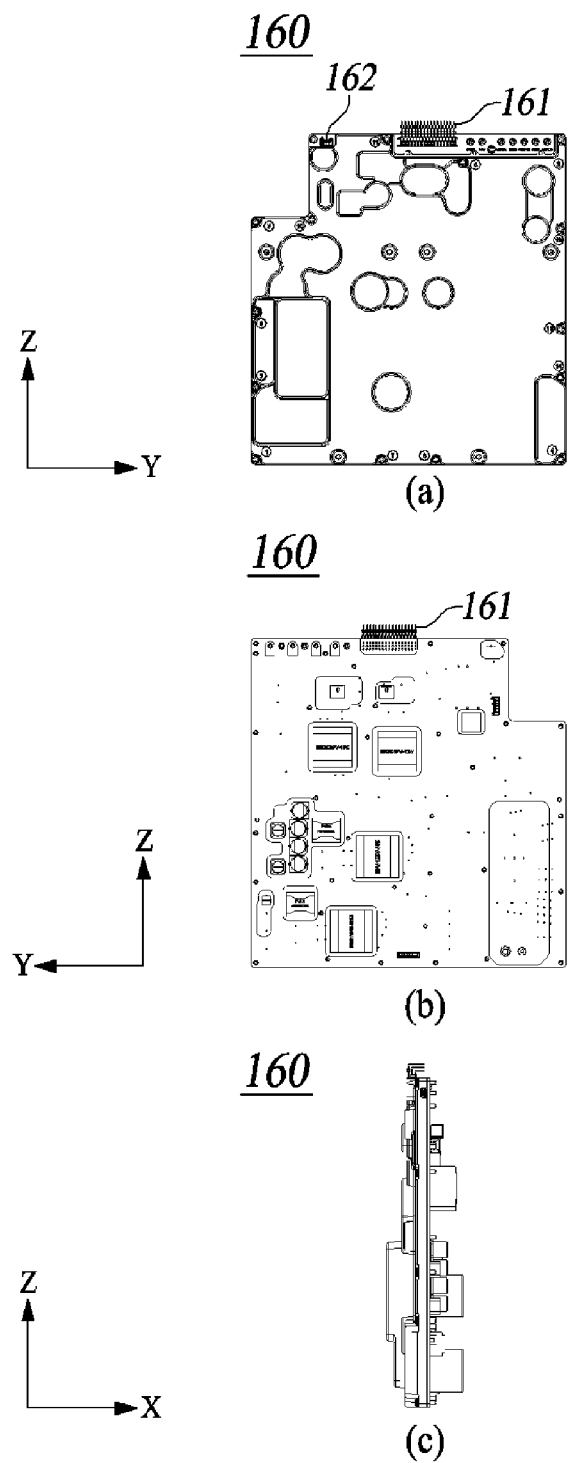
FIG. 7 is a power supply unit according to an embodiment of the present disclosure.

FIG. 7 illustrates a power supply unit 160 according to an embodiment of the present disclosure.

Specifically, FIG. 7 at (a) illustrates a front view of the power supply unit 160, FIG. 7 at (b) illustrates the rear view of the power supply unit 160, and FIG. 7 at (c) illustrates side views of the power supply unit 160.

Referring to FIG. 7 at (a) to FIG. 7 at (c), the power supply unit 160 may include a fifth interface 161 and a phase converter motor interface 162 for driving the phase converter 123 of the antenna 120.

The fifth interface 161 may be coupled to the fourth interface 152 of the digital board 150.

The power supply unit 160 may additionally include an optical switch (not shown). The optical switch may block or change the path of movement of the optical signal by adjusting the on-off state.

The power supply unit 160 may be sized to be stored in a storage space of the housing 110. For example, the horizontal length, vertical length, and thickness of the power supply unit 160 may be 247 mm, 258 mm, and 60 mm, respectively. However, the present disclosure is not limited thereto.

Figure 8:
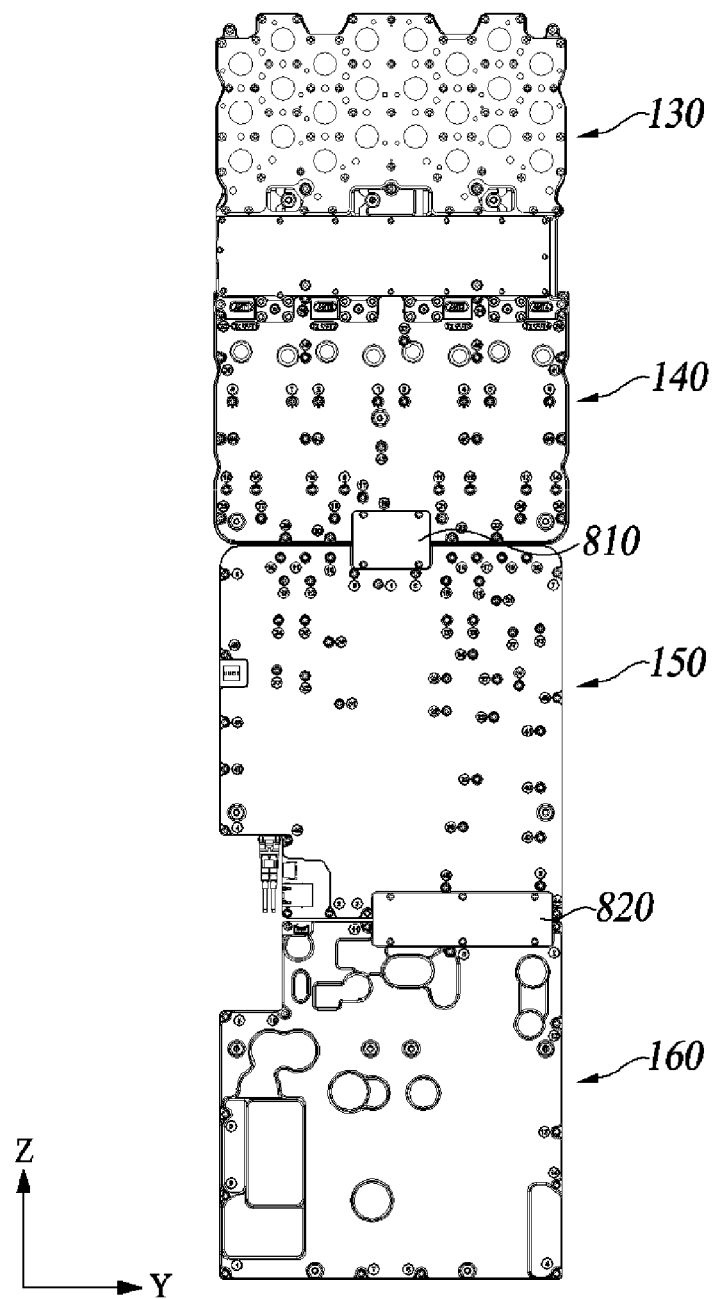
FIG. 8 is a connection region shield disposed in the connection region between the internal substrates according to an embodiment of the present disclosure.

FIG. 8 illustrates a state in which a connection area shield 810 is disposed in the connection region between the internal substrates 12 according to an embodiment of the present disclosure.

Referring to FIG. 8, the wireless communication device 10 may include the connection area shield 810.

The connection area shield 810 may be disposed in at least one of each internal substrate 12 and a connection region between the internal substrate and another adjacent internal substrate 12.

For example, the connection area shield 810 may be disposed in a connection area between the second interface 142 of the power amplification unit 140 and the third interface 151 of the digital board 150, or may be located in a connection area between the fourth interface 152 of the digital board 150 and the fifth interface 161 of the power supply unit 160.

The connection area shield 810 may be disposed to cover one surface of the connection area facing the antenna 120.

As a result, the connection area shield 810 can shield a connection area between each of the internal substrates 12, and can reduce an adverse effect of electromagnetic waves generated from the antenna 120 on each connection area.

In FIG. 8, only the connection area shield 810 for shielding the connection area between each of the internal substrates 12 is shown, but the present disclosure is not limited thereto.

For example, the wireless communication device 10 may additionally include a port shield (not shown) for shielding the external connection port 115.

Figure 9:
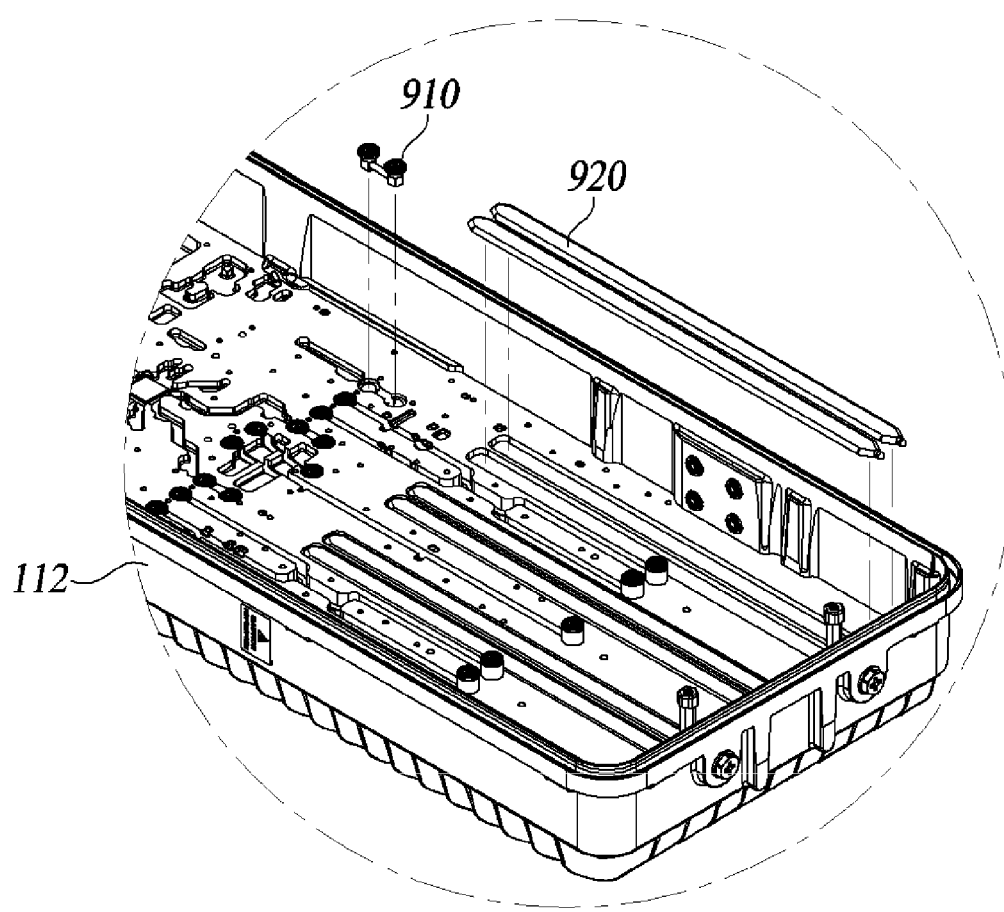
FIG. 9 is a pin socket connector disposed on a surface of a lower case according to an embodiment of the present disclosure.

FIG. 9 illustrates a state in which a pin socket connector 910 according to an embodiment of the present disclosure is disposed on one surface of the lower case 112.

Referring to FIG. 9, the wireless communication device 10 may include the pin socket connector 910 and a heat pipe 920.

The pin socket connector 910 and the heat pipe 920 may be disposed on one surface of the lower case 112 between the plurality of internal substrates 12 and the lower case 112.

The pin socket connector 910 may electrically connect internal substrates 12 that are not adjacent to each other. The internal substrates 12 spaced apart from each other can transmit and receive RF signals through the pin socket connector 910.

The heat pipe 920 may be disposed in contact with or adjacent to the plurality of internal substrates 12. As a result, heat generated from the plurality of internal substrates 12 can be smoothly released through the heat pipe 920.

The heat pipe 920 may extend long along the first direction in which the plurality of internal substrates 12 are disposed.

The heat pipe 920 may be disposed closest to the internal substrate 12 that releases relatively large amount of heat. For example, the heat pipe 920 may be disposed closest to the power amplifier 140 where relatively large amount of heat is generated.

Figure 10:
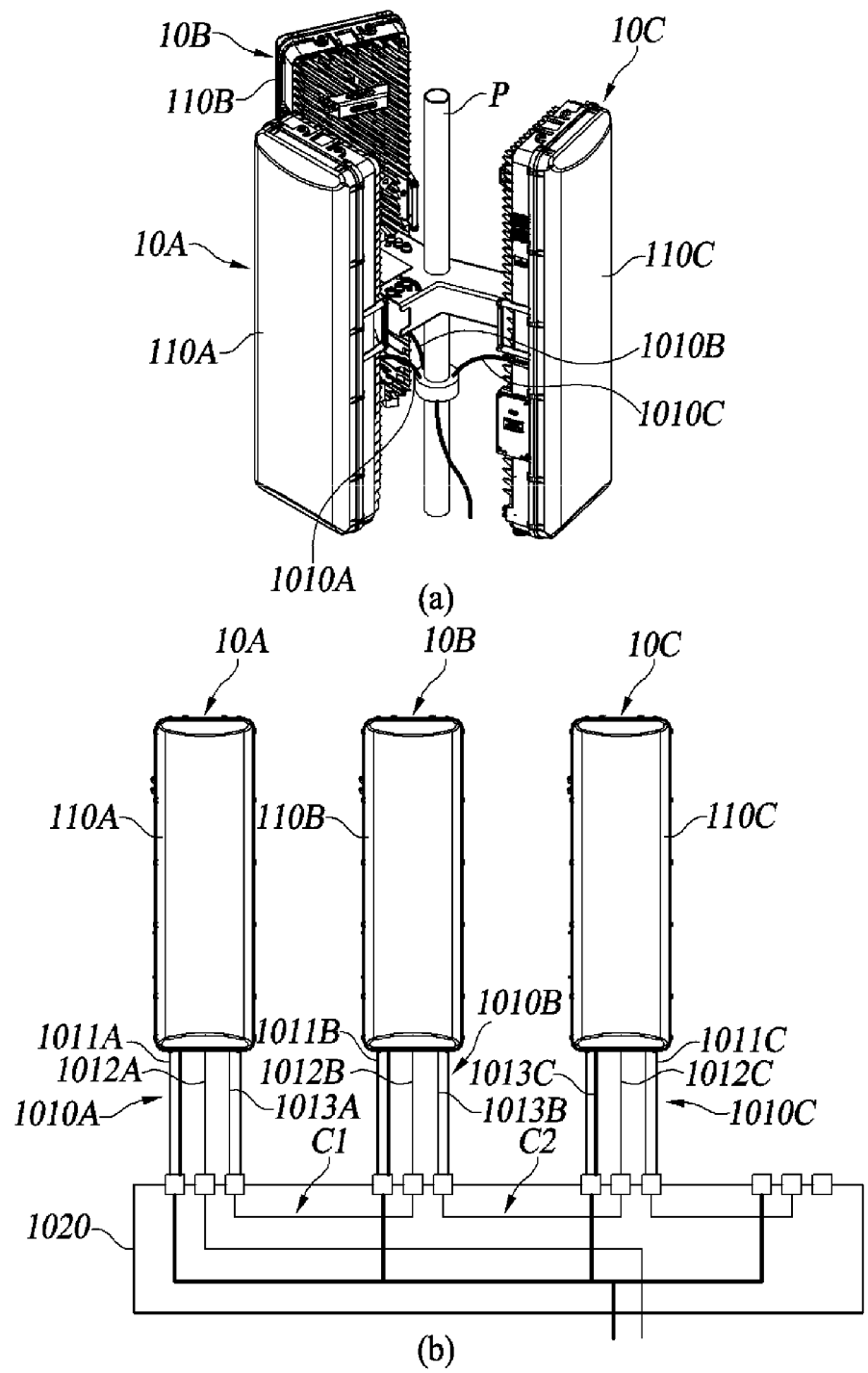
FIG. 10 is a plurality of wireless communication devices connected via hybrid cable according to an embodiment of the present disclosure.

FIG. 10 illustrates a state in which a plurality of wireless communication devices 10 according to an embodiment of the present disclosure are connected via a hybrid cable 1010.

Specifically, FIG. 10 at (a) illustrates a state in which a plurality of wireless communication devices 10 are installed on the pole P, and FIG. 10 at (b) illustrates the connection state of the plurality of the wireless communication device 10.

Referring to FIG. 10 at (a), a plurality of wireless communication devices 10 may be installed on the pole P apart from each other. In this case, each housing 110 of the plurality of wireless communication devices 10 may be connected to one hybrid cable 1010.

Referring to FIG. 10 at (b), the hybrid cable 1010 may be electrically connected to at least one of the plurality of internal substrates 12 via the external connection port 115 formed on one side of the housing 110.

The hybrid cable 1010 may include a power cable 1011, a first cable 1012, and a second cable 1013. The power cable 1011, the first cable 1012, and the second cable 1013 may be integrally formed as one.

The hybrid cable 1010 according to an embodiment of the present disclosure has an effect that, by integrally configuring the cable connected to the wireless communication device 10, it is possible to minimize an un-aesthetic effect on the surrounding view of the cable connecting to the external connection port 115.

The first cable 1012 may send a signal to the connected internal substrate 12, and the second cable 1013 may receive a signal transmitted from the connected external substrate 12. Furthermore, the power cable 1011 may supply power to the connected internal substrate 12.

The first cable 1012 and the second cable 1013 may be optical cables, but the present disclosure is not limited thereto.

The power supply cable 1011 may be provided in each of the plurality of wireless communication devices 10, and may supply power to each of the plurality of wireless communication devices 10.

On the other hand, the first cable 1012 connected to one wireless communication device 10 may be configured to electrically connect with the second cable 1013 connected to another wireless communication device 10. As a result, a signal transmitted to one wireless communication device 10 may be sequentially transmitted to another wireless communication device 10.

For example, a first wireless communication device 10A and a second wireless communication device 10B may be connected by a first connection cable C1, and the second wireless communication device 10B and a third wireless communication device 10C may be coupled by a second connection cable C2.

In this case, one end of the first connection cable C1 may be electrically connected to a second cable 1013A of the first wireless communication device 10A, and the other end of the first connection cable C1 may be electrically connected with a first cable 1012B of the second wireless communication device 10B.

In addition, one end of the second connection cable C2 may be electrically connected to the second cable 1013B of the second wireless communication device 10B, and the other end of the second connection cable C2 may also be electrically coupled to a first cable 1012C of the third wireless communication device 10C.

As a result, the signal initially delivered to the first wireless communication device 10A may be delivered to the second wireless communication device 10B via one cable C1, and the signal delivered to the second wireless communication device 10B may be delivered to the third wireless communication device 10C via another cable C2.

On the other hand, the plurality of hybrid cables 1010 may be branched from a hybrid box 1020 and connected to each housing 110 of a plurality of wireless communication devices 10.

In this case, the first connection cable C1 and the second connection cable C2 may be accommodated in the hybrid box 1020.

The hybrid box 1020 allows multiple hybrid cables 1010 to branch in one place, thereby minimizing the aesthetic impact of the hybrid cable 1010 on the surrounding view.

Another embodiment of the present disclosure shown in FIGS. 11 to 12, which will be described later, has difference from an embodiment of this disclosure illustrated in FIGS. 1 to 10 in that the wireless communication device does not include an antenna. The different features according to other embodiments of the present disclosure will be described below with a priority, and repeated description of substantially the same configuration as an embodiment of the present disclosure will be omitted.

Figure 11:
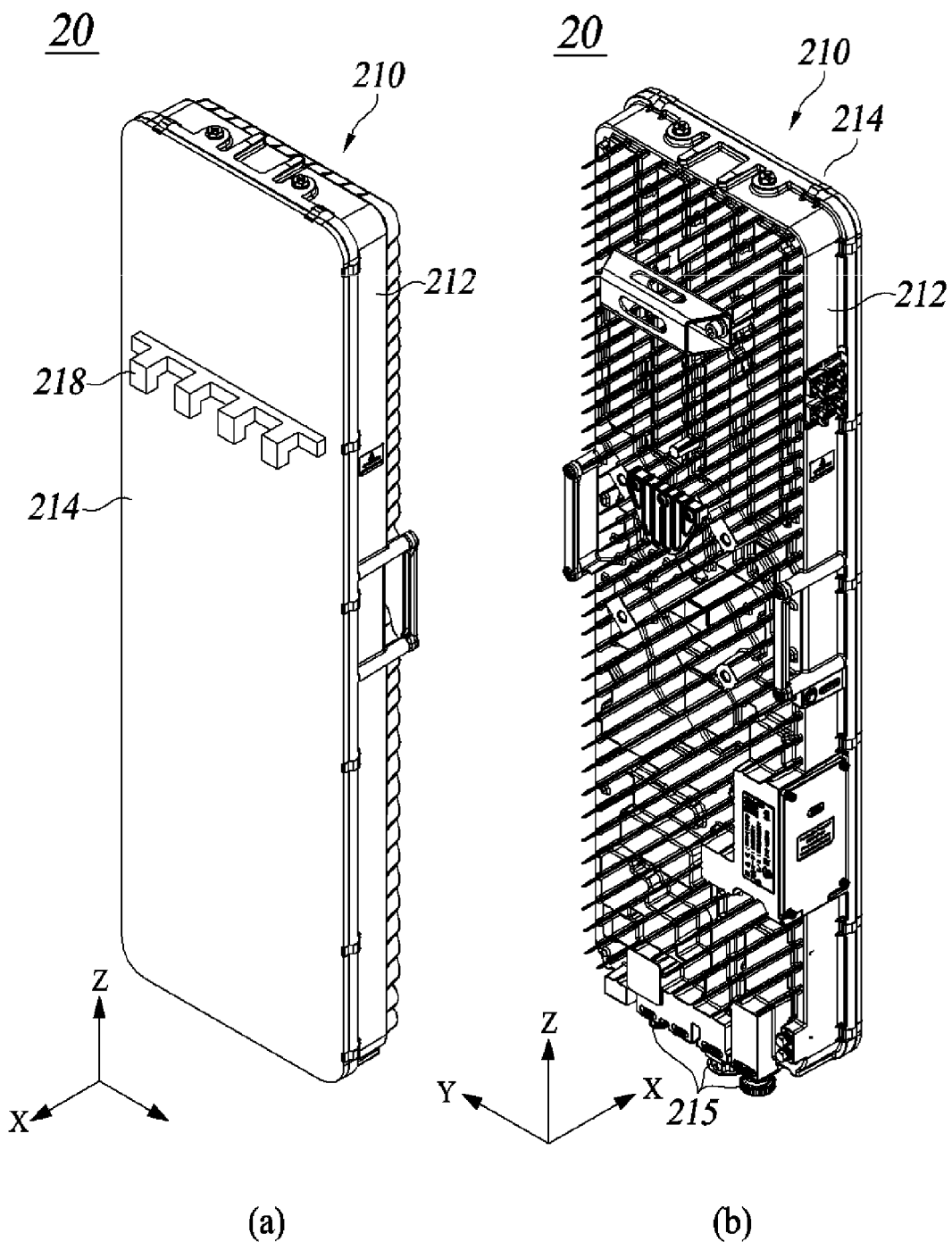
FIG. 11 is a wireless communication device according to another embodiment of the present disclosure.

FIG. 11 illustrates a wireless communication device 20 according to another embodiment of the present disclosure.

Specifically, FIG. 11 at (a) illustrates a perspective view of the wireless communication device 20, and FIG. 11 at (b) illustrates a rear perspective view of the wireless communication device 20.

Referring to FIG. 11 at (a) and FIG. 11 at (b), the wireless communication device 20 may include a housing 210.

The housing 210 may include a lower case 212 and an upper case 214.

The lower case 212 and the upper case 214 may be coupled to each other, and in the coupled state, may define a storage space between the lower case 212 and upper case 214.

The housing 210 may accommodate a plurality of internal substrates 22 in a storage space. As a result, the housing 210 can protect the plurality of internal substrates 22 from external shock.

The housing 210 may have a shape in which one of the horizontal length and vertical length is relatively longer than the other.

For example, the value obtained by dividing the longer of the horizontal length and vertical length of the housing 210 by the smaller of the horizontal length and vertical length of the housing 210 may be 3.0 or larger.

The wireless communication device 20 according to another embodiment of the present disclosure can secure a storage space having a relatively large cross-sectional area by configuring one of the horizontal length and vertical length of the housing 210 to be relatively longer than the other.

As a result, the plurality of internal substrates 22 may be arranged in the storage space of the housing 210 along a predetermined direction, and the thickness of housing 210 may be relatively thin.

Thus, the wireless communication device 20 according to another embodiment of the present disclosure may have a slim case shape as a whole, thereby having an aesthetic advantage.

Furthermore, the wireless communication device 20 according to another embodiment of the present disclosure has a technical feature in that an antenna is not provided in the accommodation space of the housing 210. Thus, the thickness of the housing 210 according to another embodiment of the present disclosure may be thinner.

For example, with the lower case 212 and the upper case 214 coupled, the thickness of the housing 210 may be 80 mm or less.

The horizontal length, vertical length, and thickness of the housing 210 may be 285 mm, 950 mm, and 70 mm, respectively. However, the present disclosure is not limited thereto.

Meanwhile, the wireless communication device 20 may additionally include an antenna connection port 218, a plurality of external connection ports 215, and a GPS antenna (not shown).

The antenna connection port 218 may be formed on the housing 210 and may be connected to an antenna (not shown) disposed outside the wireless communication device 20.

A plurality of external connection ports 215 may be formed on one side of the housing 210. The wireless communication device 20 may be connected to an external device (not shown) or other wireless communication device 20 via a plurality of external connection ports 215.

The plurality of external connection ports 215 may include, but is not limited to, an alarm port, an optical port, a power supply port, and an RTS port.

The wireless communication device 20 may transmit and receive GPS signals via a GPS antenna (not shown). The GPS antenna may be exposed outside the housing 210 for smooth transmission and reception of GPS signals.

Figure 12:
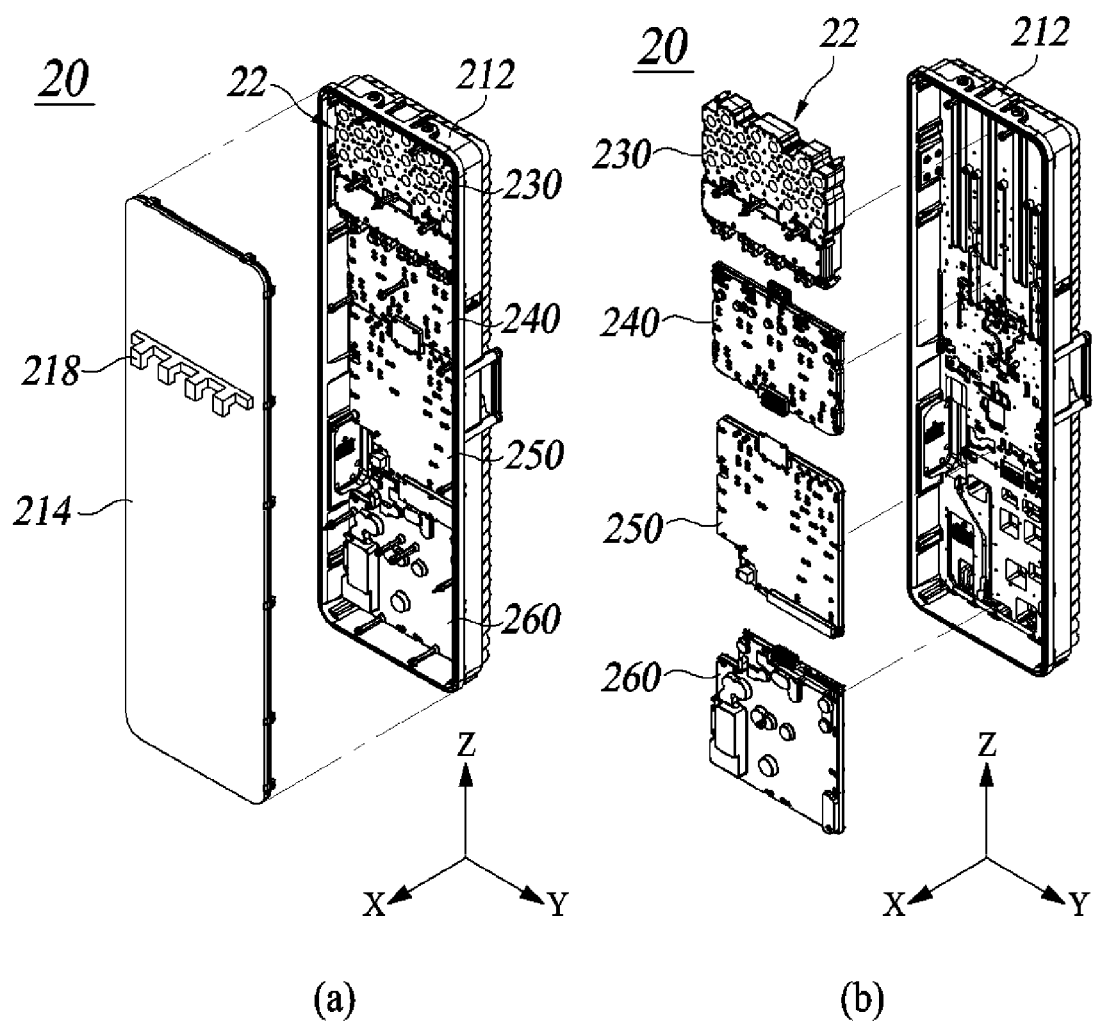
FIG. 12 is an exploded perspective view of a wireless communication device according to another embodiment of this disclosure.

FIG. 12 is an exploded perspective view of a wireless communication device 20 in accordance with another embodiment of the present disclosure.

Specifically, FIG. 12 at (a) illustrates an exploded perspective view of a state in which the plurality of internal substrates 22 are disposed on the lower case 212, and FIG. 12 at (b) illustrates a disassembled perspective view in which the plurality of internal substrates 22 is separated from the lower case 212.

Referring to FIG. 12 at (a) and FIG. 12 at (b), the wireless communication device 20 may include the plurality of internal substrates 22.

The plurality of internal substrates 22 may be disposed between the upper case 214 and the lower case 212 in the storage space. At least one of the plurality of internal substrates 22 may be coupled with an external antenna (not shown), through which signals may be received from or transmitted to.

Each internal substrate 22 of the plurality of internal substrates 22 may be disposed along a first direction that is parallel to a surface of the lower case 212 that faces the internal substrates 22. Herein, the first direction refers to a direction in which the plurality of internal substrates 22 are arranged. For example, the first direction may be parallel to the vertical direction of the housing 210, with reference to FIG. 12.

The wireless communication device 20 according to another embodiment of the present disclosure is characterized in that the housing 210 has a thinner thickness by adopting a method in which the plurality of internal substrates 22 are arranged in a line along a predetermined direction, rather than a method of stacking the plurality of internal substrates 22.

As such, the wireless communication device 20 according to another embodiment of the present disclosure may be installed in coordination with the surrounding scenery. As such, the wireless communication device 20 according to another embodiment of the present disclosure may have aesthetic benefits.

In FIG. 12, the first direction is shown to be parallel to the vertical direction of the housing 210, but the present disclosure is not limited thereto.

For example, the first direction may be parallel to the horizontal direction of the housing 210. In this case, the plurality of internal substrates 22 may be arranged along the horizontal direction of the housing 210.

Each internal substrate 22 may be arranged in a row along the first direction, although the present disclosure is not limited thereto. For example, each of the internal substrates 22 may be disposed offset from each other along the first direction or in a zigzag shape.

Each internal substrate 22 may be electrically connected to a neighboring internal substrate 22. In this case, an area of each internal substrate 22 other than a connection area with the neighboring internal substrate 22 may not overlap with the neighboring internal substrate 22.

Accordingly, the wireless communication device 20 according to another embodiment of the present disclosure can minimize the area overlapping between each of the plurality of internal substrates 22 and maximize the area of the internal substrate 22 exposed to the outside. Thereby, heat generated from the plurality of internal substrates 22 may be effectively released.

The plurality of internal substrates 22 may include a front end unit 230, a power amplifier 240, a digital board 250, and a power supply unit 260. However, the present disclosure is not limited thereto, and the plurality of internal substrates 22 may include other members.

The plurality of internal substrates 22 may be disposed in the order of the front end unit 230, the power amplifier 240, the digital board 250, and the power supply unit 260 along the first direction.

Such an arrangement of the internal substrate 22 may be an arrangement according to a processing order of signals transmitted to or received from the antenna. This sequence of placement can thus minimize electrical connections between each internal substrate 22 and other internal substrates 22 that are not adjacent thereto.

Accordingly, it is possible to minimize the configuration of the circuit for connecting each internal substrate 22 to another internal substrate 22 which is not adjacent thereto, and thus the configuration for the plurality of internal substrate 22 may be further simplified.

Although exemplary embodiments of the present disclosure have been described for illustrative purposes, those skilled in the art will appreciate that various modifications, additions, and substitutions are possible, without departing from the idea and scope of the claimed disclosure. Therefore, exemplary embodiments of the present disclosure have been described for the sake of brevity and clarity. The scope of the technical idea of the present embodiments is not limited by the illustrations. Accordingly, one of ordinary skill would understand the scope of the claimed disclosure is not to be limited by the above explicitly described embodiments but by the claims and equivalents thereof.

What is claimed is:

1. A wireless communication device, comprising:
   a lower case;
   an upper radome configured to be coupled to the lower case, and create a storage space between the lower case and the upper radome;
   an antenna disposed in the storage space;
   a plurality of internal substrates disposed between the antenna and the lower case in the storage space, of which one of the plurality of internal substrates is connected to the antenna,
   a pin socket connector configured to electrically connect each internal substrate and transmit and receive RF signals; and
   a connection area shield disposed to shield a connection area between at least two of the internal substrates,
   wherein each internal substrate of the plurality of internal substrates is disposed along a first direction parallel to one surface of the lower case facing the plurality of internal substrates.

2. The device of claim 1, wherein the plurality of internal substrates comprises a front end unit, a power amplifying unit, a digital board, and a power supply unit.

3. The device of claim 2, wherein the plurality of internal substrates is arranged along the first direction in the order of the front end unit, the power amplifying unit, the digital board, and the power supply unit.

4. The device of claim 1,
   wherein each internal substrate is connected to a neighboring internal substrate, and
   wherein the connection area shield is disposed in at least one of connection area between the internal substrate and the neighboring internal substrate thereof.

5. The device of claim 1, wherein each internal substrate is connected to a neighboring internal substrate, and
   wherein an area of each internal substrate other than a connection area with the adjacent internal substrate does not overlap with the neighboring internal substrate.

6. The device of claim 1, further comprising:
   a housing comprising the lower case and the upper radome, and
   wherein thickness of the housing is 165 mm or less when the lower case and the upper radome are coupled.

7. The device of claim 6, wherein a value obtained by dividing a longer one of the horizontal length and vertical length of the housing by a smaller one of the horizontal length and the vertical length is 3.0 or larger.

8. The device of claim 1, wherein the plurality of internal substrates are arranged in a line along the first direction.

9. The device of claim 1 further comprising:
a housing comprising the lower case and the upper radome; and
a hybrid cable connected to at least one of the plurality of internal substrates via an external connection port formed on one side of the housing, and
wherein the hybrid cable comprises a first cable for transmitting a signal to at least one internal board, a second cable for receiving a signal delivered from at least one external board, and a power supply cable for supplying power to the at least one internal board, and
wherein the first cable, the second cable, and the power supply cable are integrally formed as one.

10. A wireless communication device, comprising:
a lower case;
an upper case configured to be coupled with the lower case;
a plurality of internal substrates disposed between the lower case and the upper case;
a pin socket connector configured to electrically connect each internal substrate and transmit and receive RF signals; and
a connection area shield disposed to shield a connection area between at least two of the internal substrates, wherein each of the plurality of internal substrates is disposed along a first direction parallel to a surface of the lower case facing the plurality of internal substrates.

11. The device of claim 10, wherein the plurality of internal substrates comprises a front end unit, a power amplifying unit, a digital board, and a power supply unit.

12. The device of claim 10, wherein the plurality of internal substrates is arranged along the first direction in the order of the front end unit, the power amplifying unit, the digital board, and the power supply unit.

13. The device of claim 10,
wherein each internal substrate is connected to a neighboring internal substrate, and
wherein the connection area shield is disposed in at least one of the connection areas between the internal substrate and the neighboring internal substrate thereof.

14. The device of claim 10, wherein each internal substrate is connected to a neighboring internal substrate, and
wherein an area of each of the internal substrates other than a connection area with the adjacent internal substrate does not overlap with the neighboring internal substrate.

15. The device of claim 10, further comprising:
a housing including the lower case and the upper case, and
wherein thickness of the housing is 80 mm or less when the lower case and the upper case are coupled.

16. The device of claim 15, wherein a value obtained by dividing a longer one of the horizontal length and vertical length of the housing by a smaller one of the horizontal length and the vertical length is 3.0 or larger.

* * * * *